Aug. 9, 1932.    B. V. HOARD    1,870,810
TRANSMISSION LINE STABILITY SYSTEM
Filed Aug. 21, 1931
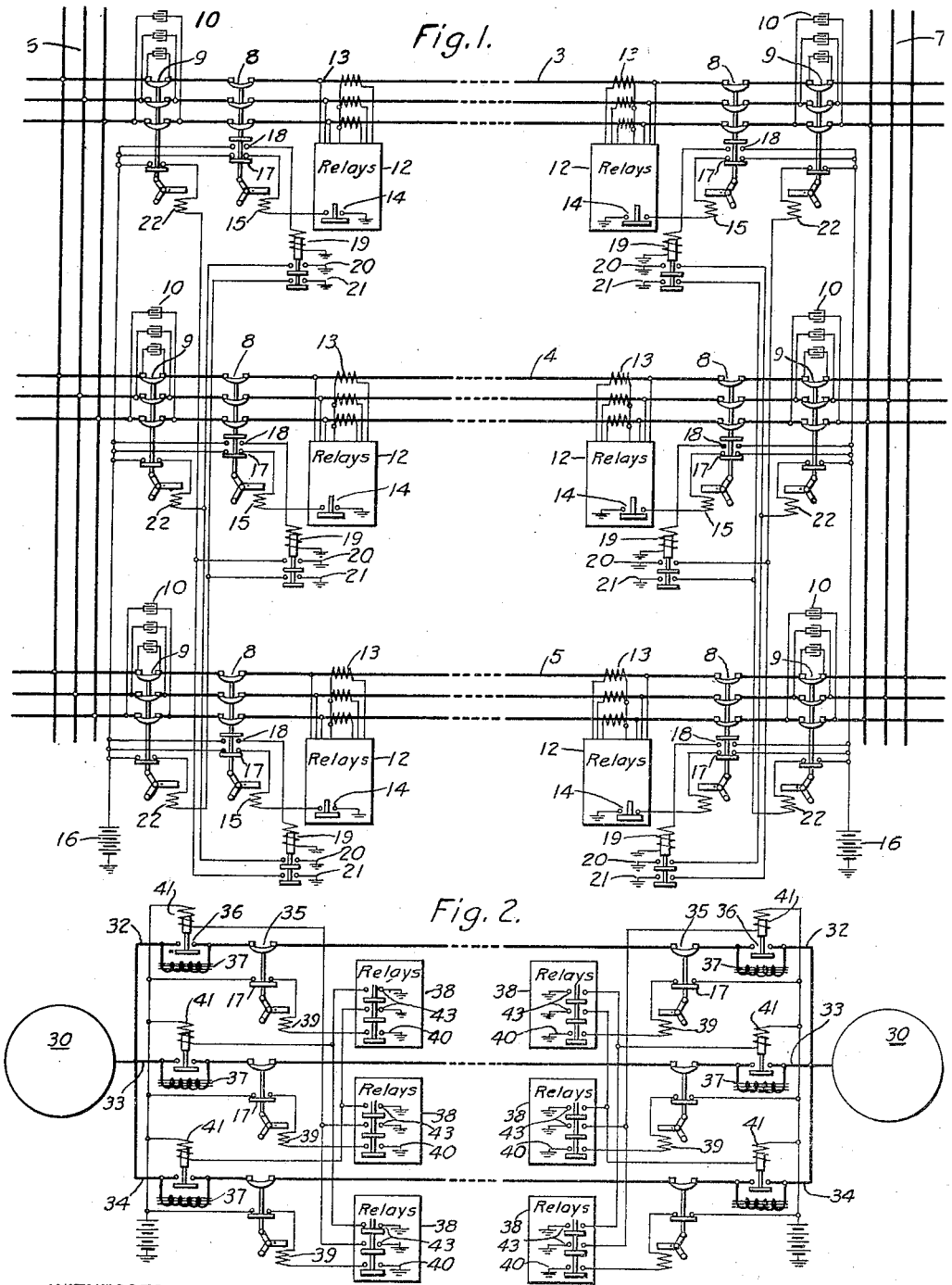
WITNESSES:
INVENTOR
Bert V. Hoard
BY
ATTORNEY Patented Aug. 9, 1932

1,870,810

UNITED STATES PATENT OFFICE

BERT V. HOARD, OF WILKINSBURG, PENNSYLVANIA, ASSIGNOR TO WESTINGHOUSE ELECTRIC & MANUFACTURING COMPANY, A CORPORATION OF PENNSYLVANIA

TRANSMISSION LINE STABILITY SYSTEM

Application filed August 21, 1931. Serial No. 558,628.

My invention relates to apparatus, systems and methods for securing transmission line stability in systems utilizing synchronous apparatus at each end of a transmission line, and particularly in systems utilizing multi-circuit transmission lines, so that when one circuit becomes faulted and is tripped out, the remaining circuit or circuits will transmit the entire power.

In such transmission systems, instability, or loss of synchronism, almost invariably occurs as a result of a phase-swing of the voltages at the sending and receiving ends, resulting from a fault on one of the circuits, or from the tripping-out operation. A transmission line can not transmit any power except that which corresponds exactly to a certain phase-angle between the sending and receiving ends, said phase-angle being dependent upon the amount of reactance in the line. When one of the lines is disconnected from service, on account of a fault, the reactance of the transmission system is increased, so that the transmission line can not transmit the same amount of power until the phase-angle has been proportionately increased. This sets up an angular swing which may be sufficient to cause the sending and receiving ends to lose synchronism, thus resulting in instability.

The above-described limit of stability, which is usually referred to as the transient stability limit, is so serious that the full power rating of the transmission line has to be reduced to somewhere around one-half of its steady-state stability limit, in order to allow a safe margin for the above-described phase-swings.

In a long line, the reactance of the line is the important factor in limiting the amount of current which may be sent over the line for a given voltage, because the line-reactance is then commensurate with, or greater than, the reactances between the internal voltages of the synchronous machines and the line.

In accordance with my invention, means are provided for changing the reactance of the sound circuits of a multi-circuit transmission line, whenever one of the lines is tripped out, so that the resultant shock on the transmission system shall be a minimum. In other words, the reactance of the system after the switching operation is made equal, or nearly equal, to the reactance of the system before the switching operation. During the few cycles that the fault is on the system, there may be a slight phase-swing in the sending and receiver voltages, in which case, it may be desirable to make the post-switching reactance such as to correspond to this new phase-angle rather than the ante-switching phase-angle, in which case, the line-reactance after the switching operation would not be quite the same as the line-reactance before the switching operation. When I speak of the line-reactances being made substantially the same, therefore, I mean to include the situation just described.

In carrying out my invention, I utilize either a series capacitor in series with each line, said capacitor being normally short-circuited, and being open-circuited whenever one of the lines is tripped out, or I utilize a series inductance which is short-circuited when one of the lines is tripped out.

In the accompanying drawing:

Figure 1 is a diagrammatic view of circuits and apparatus embodying my invention in a three-phase multi-circuit transmission line, utilizing series capacitors, and Fig. 2 is a single-line diagram of a three-phase, multi-circuit transmission line embodying my invention, utilizing series inductances.

In the system shown in Fig. 1, the transmission line consists of three three-phase circuits 3, 4 and 5 which are represented as line-sections of a longer line, said sections being bussed together at their ends, as indicated at 6 and 7. Two circuit-breakers are provided at each end of each line-section, namely an ordinary sectionalizing circuit-breaker 8 for tripping out the line-section or line-circuit in case a fault should occur thereon, and an auxiliary circuit-breaker 9 which is shunted around a bank of capacitors 10. The sectionalizing breaker will ordinarily be of the type which is fast in its operation, in accordance with present-day switching practice. The auxiliary breaker 9 will be of very much smaller KVA capacity than the main breaker 8, because it is shunted by the condenser bank 10. In general, therefore the auxiliary breaker 9 will require much less separation of its arcing terminals in order to interrupt the arc therein when the breaker is opened, so that it will be materially quicker than the main circuit-breaker 8.

I have not attempted to show details of construction of the circuit-breakers or of the relays for controlling the main sectionalizing circuit-breaker, as these may be of a standard construction such as is available on the market today. I have indicated the relays schematically, therefore, at 12 as representing an apparatus, or aggroupment of apparatus, which responds to both the voltage and the current of the line-section with which it is related, as indicated by the connections 13. The actuation of the relays 12 results in the closure of switch contacts 14 which energize the tripping coil 15 of the sectionalizing breaker 8, supplying thereto a powerful direct current from a battery 16 or other suitable source, so that very quick tripping is effected. When the main circuit-breaker is open, or nearly open, auxiliary back contacts 17 are opened, thus opening the tripping circuit, so as to prevent damage from the heavy tripping current, as is known in the art. When the main circuit-breaker 8 is open, or nearly open, a second auxiliary contact 18 is closed, in accordance with my present invention, thereby energizing a relay 19 from the same battery 16, or other source of power. The relay 19 thereupon picks up instantly and closes circuits 20 and 21 which energize the tripping coils 22 of the auxiliary breakers 9 in the two remaining line-sections or circuits of the system, so that these auxiliary breakers are stripped, thereby connecting the series capacitors 10 in the two sound circuits or line-sections.

It is usually desirable to cause these capacitors to be connected into the sound line-sections after the main circuit-breaker 8 in the faulted section is fully open, so that the fault current will not be increased by the premature insertion of the series capacitors in the remaining lines.

In the case of cascade operation of the main circuit-breakers 8 at the two ends of a faulty line-section, as when the fault occurs very close to one of the ends of the line, no harm will be done, in general, by the insertion of the series capacitors in the good circuits at the end which is closest to the fault, it being understood that the relays will always trip the main circuit-breaker first at the end closest to the fault, under such conditions.

Any suitable means may be provided for restoring the line to its original operating condition after the fault has been cleared. It is not deemed necessary to illustrate such means in the present application.

The equipment just described will be duplicated at each end of each of the three line-sections 3, 4 and 5.

Fig. 2 is a single-line diagram of a polyphase, multi-circuit transmission system, the three-phase conductors being indicated by a single line, in accordance with a well known convention. The synchronous machine or machines at the sending end are indicated by a large circle 30, and at the receiving end by a similar circle 31. The three parallel line-circuits are indicated at 32, 33 and 34. Each line-circuit is provided, at each of its ends, with a main sectionalizing circuit-breaker 35 and an auxiliary circuit-breaker or circuit-interrupter 36. The auxiliary circuit-interrupter 36, in this case, is normally open and is shunted by a reactor 37 which is thus connected in series with the line-circuit. Relays 38 are provided, for controlling the tripping coils 39 of the main circuit-breakers 35, through movable switch contacts 40, as in Fig. 1.

The actuation of the auxiliary circuit-interrupter 36 is somewhat different in Fig. 2 than in Fig. 1, because, in Fig. 2, it is necessary to close the auxiliary breakers 36 of the two sound-lines when the main circuit-breaker 35 of a faulty line is opened. In general, a circuit-breaker operates more sluggishly in response to its closing coil than in response to its tripping coil, so that the problem is to make the auxiliary breakers close quickly enough rather than to prevent them from opening too quickly, as in Fig. 1. The speed of closing can be controlled, of course, by providing the auxiliary breakers with sufficiently powerful closing-coils 41.

In the system shown in Fig. 2, the main relays 38, which trip out the main circuit-breakers 35 of a faulty line-section, are also provided with auxiliary relay-contacts 43 which are closed simultaneously with the main tripping-contacts 40. These auxiliary contacts 43 energize the closing-coils 41 of the auxiliary circuit-breakers 36 in the two sound-lines at the same time when the relay-contact 40 energizes the tripping-coil 39 of the main circuit-breaker 35 in the faulty line. In this manner, the series reactors 37 in the sound-lines are tripped out at about the same time, or shortly after, the faulty line-section is disconnected from the transmission system.

The sizes of the capacitors or reactors are determined in accordance with the principles pointed out at the outset of this specification. Instead of using capacitors or reactors at both ends of each line-section, a single larger capacitor or reactor may be utilized at only one end, as will be obvious, or a capacitor may be utilized at one end and a reactor at the other end, with suitable auxiliary circuit-breaker equipment as described in connection with Figs. 1 and 2, respectively. The capacitors may be directly connected in series with the line or they may be connected through transformers, and they may be protected against excessive voltages in any desired manner. These details are more or less well known to the skilled workers of the art, as it is understood today, and do not need any further explanation in the present specification.

While I have shown my invention in two forms of embodiment, it will be understood that such showing is merely illustrative of the general principles thereof and that numerous variations in the mode of execution may be resorted to within the scope of my invention, as defined in the appended claims.

I claim as my invention:

1. A multi-circuit synchronous-synchronous transmission system having means for cutting out a faulty circuit and means for substantially simultaneously restoring the system reactance after said cutting-out operation to substantially the value that it had before said cutting-out operation.

2. A multi-circuit three-phase transmission system having means for cutting out a faulty circuit and means for substantially simultaneously changing the system reactance after said cutting-out operation to such a value as to substantially minimize the angular swing of the sending and receiving ends of the transmission system.

3. A multi-circuit synchronous-synchronous transmission system having normally closed main circuit-breaker means in series with each of the parallel line-circuits at each end thereof, relay means for selectively opening said main circuit-breaker means in response to fault conditions, normally closed auxiliary circuit-breaker means in series with each of the parallel line-circuits, capacitor-means shunting said auxiliary circuit-breaker means, and means for automatically opening the auxiliary circuit-breaker means in the sound circuit or circuits when a main circuit-breaker means opens in a faulty circuit.

4. A multi-circuit synchronous-synchronous transmission system having normally closed main circuit-breaker means in series with each of the parallel line-circuits at each end thereof, relay means for selectively opening said main circuit-breaker means in response to fault conditions, normally closed auxiliary circuit-breaker means in series with each of the parallel line-circuits, capacitor-means shunting said auxiliary circuit-breaker means, and means for automatically opening the auxiliary circuit-breaker means in the sound circuit or circuits when a main circuit-breaker means opens in a faulty circuit, said automatic means comprising back contacts on the main circuit-breaker means.

5. A multi-circuit synchronous-synchronous transmission system having normally closed main circuit-breaker means in series with each of the parallel line-circuits at each end thereof, relay means for selectively opening said main circuit-breaker means in response to fault conditions, normally open auxiliary circuit-interrupter means in series with each of the parallel line-circuits, reactance-means shunting said auxiliary circuit-interrupter means, and means for automatically closing the auxiliary circuit-interrupter means in the sound circuit or circuits when a main circuit-breaker means opens in a faulty circuit.

6. A multi-circuit synchronous-synchronous transmission system having normally closed main circuit-breaker means in series with each of the parallel line-circuits at each end therof, relay means for selectively opening said main circuit-breaker means in response to fault conditions, normally open auxiliary circuit-interrupter means in series with each of the parallel line-circuits, each of said auxiliary circuit-interrupter means having electrically operated closing means, reactance-means shunting said auxiliary circuit-interrupter means, and means for automatically closing the auxiliary circuit-interrupter means in the sound circuit or circuits when a main circuit-breaker means opens in a faulty circuit, said automatic means comprising auxiliary contacts closed by the fault-responsive relay means for energizing said closing means of the auxiliary circuit-interrupter means.

In testimony whereof, I have hereunto subscribed my name this 25th day of May, 1931.

BERT V. HOARD.